United States Patent
Ren et al.

(10) Patent No.: US 10,670,424 B2
(45) Date of Patent: Jun. 2, 2020

(54) METHOD FOR INITIAL ALIGNMENT OF AN INERTIAL NAVIGATION APPARATUS

(71) Applicant: SHANGHAI HUACE NAVIGATION TECHNOLOGY LTD, Shanghai (CN)

(72) Inventors: Qiang Ren, Shanghai (CN); Jiejun Wang, Shanghai (CN); Xuefeng Shen, Shanghai (CN); Lilong Wei, Shanghai (CN); Guiyan Cui, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 395 days.

(21) Appl. No.: 15/542,442

(22) PCT Filed: Jul. 4, 2016

(86) PCT No.: PCT/CN2016/088343
§ 371 (c)(1),
(2) Date: Jul. 10, 2017

(87) PCT Pub. No.: WO2017/063388
PCT Pub. Date: Apr. 20, 2017

(65) Prior Publication Data
US 2018/0274940 A1    Sep. 27, 2018

(30) Foreign Application Priority Data
Oct. 13, 2015 (CN) .......................... 2015 1 0669553

(51) Int. Cl.
*G01C 25/00* (2006.01)
*G01C 21/16* (2006.01)

(52) U.S. Cl.
CPC ........... *G01C 25/005* (2013.01); *G01C 21/16* (2013.01); *G01C 25/00* (2013.01)

(58) Field of Classification Search
CPC ....... G01C 25/005; G01C 21/16; G01C 25/00
See application file for complete search history.

(56) References Cited

U.S. PATENT DOCUMENTS

| 3,638,883 A | * | 2/1972 | Lanzaro | ................. | G01C 19/42 244/165 |
| 5,886,257 A | * | 3/1999 | Gustafson | ............. | G01C 21/16 244/171 |

(Continued)

FOREIGN PATENT DOCUMENTS

| CN | 101701825 A | 5/2010 |
| CN | 101975872 A | 2/2011 |

(Continued)

OTHER PUBLICATIONS

Hui et al. Research on Calibration Method for the Installation Error of three-axis Acceleration Sensor (Year: 2011).*

(Continued)

*Primary Examiner* — Mohammad K Islam
(74) *Attorney, Agent, or Firm* — Bayramoglu Law Office LLC

(57) ABSTRACT

A method for initial alignment of an inertial navigation apparatus, comprising the following steps: providing an apparatus loaded with a sensor, and preprocessing the sensor; carrying out relative alignment to calculate an installation error angle of the sensor; carrying out absolute alignment to calculate an installation attitude angle error of the sensor to increase an accuracy of an error attitude angle calculated during the relative alignment. The relative alignment process calculates a relative error attitude angle, the relative error attitude angle being used as the initial value for attitude error in a stat vector in the absolute alignment process, thereby accelerating convergence of the Kalman filter. Alignment precision is further enhanced by the absolute alignment process.

6 Claims, 3 Drawing Sheets

(56) References Cited

U.S. PATENT DOCUMENTS

| | | | | |
|---|---|---|---|---|
| 6,341,249 B1* | 1/2002 | Xing | B64G 1/1085 | 701/13 |
| 6,453,239 B1* | 9/2002 | Shirasaka | G01C 21/16 | 701/508 |
| 6,647,352 B1* | 11/2003 | Horton | G01C 21/16 | 702/151 |
| 8,224,574 B2* | 7/2012 | Tazartes | G01C 25/005 | 244/3.1 |
| 2003/0149529 A1 | 8/2003 | Heatwole et al. | | |
| 2007/0100550 A1* | 5/2007 | Hawkinson | G01C 21/16 | 701/510 |
| 2007/0213889 A1* | 9/2007 | Parra Carque | G01C 3/08 | 701/7 |
| 2007/0250261 A1* | 10/2007 | Soehren | G01C 21/16 | 701/510 |
| 2008/0167770 A1* | 7/2008 | Macdonald | G01S 5/0252 | 701/24 |
| 2008/0208501 A1 | 8/2008 | Fiedler et al. | | |
| 2010/0019963 A1* | 1/2010 | Gao | G01S 5/0027 | 342/357.31 |
| 2010/0126785 A1* | 5/2010 | Shimada | B62D 57/032 | 180/8.1 |
| 2012/0173142 A1* | 7/2012 | Czompo | G01S 19/52 | 701/501 |
| 2012/0176492 A1* | 7/2012 | Garin | G06T 7/70 | 348/116 |
| 2013/0245984 A1* | 9/2013 | Sheng | G01R 33/0035 | 702/94 |
| 2014/0372063 A1* | 12/2014 | Niu | G01C 25/005 | 702/104 |
| 2015/0033821 A1* | 2/2015 | Mangano | G01C 25/005 | 73/1.77 |
| 2015/0052988 A1* | 2/2015 | Price | E21B 47/024 | 73/152.17 |
| 2015/0177020 A1* | 6/2015 | An | G01C 17/38 | 702/92 |
| 2016/0040992 A1* | 2/2016 | Palella | G01C 21/165 | 702/152 |
| 2016/0161260 A1* | 6/2016 | Mourikis | G01C 21/165 | |
| 2016/0223357 A1* | 8/2016 | Frey, Jr. | G01C 25/005 | |
| 2016/0282137 A1* | 9/2016 | Stewart | G01P 21/00 | |
| 2016/0349058 A1* | 12/2016 | Yu | H01Q 3/02 | |
| 2017/0113065 A1* | 4/2017 | Inaniwa | A61B 6/5217 | |

FOREIGN PATENT DOCUMENTS

| | | |
|---|---|---|
| CN | 102168991 A | 8/2011 |
| CN | 103245359 A | 8/2013 |
| CN | 103743414 A | 4/2014 |
| CN | 104165638 A | 11/2014 |
| CN | 105203129 A | 12/2015 |

OTHER PUBLICATIONS

Skog et al., In-car positioning and navigation technologies—a survey, IEEE (Year: 2008).*

Zhang, Hui et al., "Research on Calibration Method for the Installation Error of Three-Axis Acceleration Sensor", Chinese Journal of Sensors and Actuators, vol. 24, No. 11, Nov. 30, 2011 (Nov. 30, 2011), pp. 1543-1546.

* cited by examiner

METHOD FOR INITIAL ALIGNMENT OF AN INERTIAL NAVIGATION APPARATUS

CROSS REFERENCE TO RELATED APPLICATIONS

This application is the national phase entry of International Application No. PCT/CN2016/088343, filed on Jul. 4, 2016, which is based upon and claims priority to Chinese Patent Application No. 201510669553.0 filed on Oct. 13, 2015, the entire contents of which are incorporated herein by reference.

TECHNICAL FIELD

The present invention is directed to the issue that conventional initial alignment algorithm is not suitable for inertial navigation apparatuses with low cost and low performance in the field of agricultural machine and engineering machine. The present invention provides an initial alignment method for the above-mentioned field, particularly for the agricultural machine.

BACKGROUND

As MEMS (Micro-Electro-Mechanical-System) sensors, navigation, and control technology develop, combined with increasing government support for agriculture, has led to precision agriculture becoming increasingly popular. During agricultural machine-assisted driving control, the motion and position information of the vehicle body can be reflected by the attitude (including pitch angle, the roll angle, and course angle), speed, and position information of the vehicle body in real time. This information can provide important data input for a combined navigation and control algorithm with high-precision.

Strapdown-Inertial-Navigation-System (SINS) has features such as: autonomous navigation, good confidentiality, strong anti-interference ability, having plentiful navigation parameters, having high precision for using in a short period time, etc., and is widely used. However, since the inertial sensor has inherent errors, as time goes by, navigation errors accumulate and the accuracy of the navigation deteriorates, such that the assistant of other navigation systems (e.g. a high-precision GPS-RTK) with stable error are required. The inertial navigation system obtains velocity and position information by carrying out an integral operation based on the measured acceleration of the vehicle body. Hence, it is necessary to know initial velocity and position. Additionally, in an inertial navigation system taking the geographic coordinate system as a navigation coordinate system, either the physical platform or the mathematical platform is a reference for measuring the acceleration. Furthermore, the platform must accurately align and track the geographic coordinate system to avoid the error of the platform from causing the error in acceleration measurement. The accuracy of initial alignment directly relates to the working accuracy of the navigation system. Thus, the initial alignment is also one of the key technologies.

There are two commonly used alignment methods: coarse alignment and alignment. However, the two alignment methods are mainly used with high-precision gyroscopes, which can sense the angular speed of Earth's rotation. Therefore, these two alignment methods are not suitable for the inertial navigation apparatus with a low-cost and low-performance.

SUMMARY OF THE INVENTION

The present invention is directed to an issue that conventional initial alignment algorithms are not suitable for inertial navigation apparatuses with low cost and low performance that are used in the field of agricultural machines and engineering machines. The present invention provides an initial alignment method for the above-mentioned field, particularly for the agricultural machine.

The technical solution of the present invention is a method for initial alignment of an inertial navigation apparatus. The method includes the following steps: providing an apparatus loaded with a sensor, and preprocessing, by a processor, the sensor data; carrying out, by the processor, a relative alignment process to obtain an installation error angle of the sensor; and carrying out, by the processor, an absolute alignment process to obtain an installation attitude angle error of the sensor and further improving an accuracy of the error attitude angle calculated based on the relative alignment.

In the above method, wherein, the step of preprocessing the sensor includes the following steps: initializing the sensor; and filtering the sensor to reduce an effect of vibration of the apparatus on the sensor.

In the above method, the step of carrying out relative alignment processing includes the following steps: positioning, by the processor, the apparatus to be stationary towards a direction, collecting three-axis acceleration data, then turning the apparatus by 180 degrees, collecting the three-axis acceleration data; and calculating the installation error angle of the sensor to obtain the installation error angles of the sensor in different directions.

In the above method, the formula for calculating the installation error angles is:

$$A \cdot f_X^b + B \cdot f_Y^b + C \cdot f_Z^b = 1$$

$$A = \frac{\sin\gamma \sin\varphi - \cos\gamma \sin\theta \cos\varphi}{g \cos\alpha}$$

$$B = \frac{\sin\gamma \cos\varphi + \cos\gamma \sin\theta \sin\varphi}{g \cos\alpha}$$

$$C = \frac{\cos\gamma \cos\theta}{g \cos\alpha},$$

where A, B, C are model coefficients; $f_X^b$, $f_Y^b$, $f_Z^b$ are output values of an accelerometer in the sensor; $\gamma, \theta, \varphi$ are installation error angles of the sensor, g is the gravitational acceleration of the Earth, $\alpha$ is the angle between the plane where the apparatus locates and the horizontal plane.

In the above method, the least square data fitting is performed to obtain the formula for calculating the model coefficients A, B, C:

$$\begin{bmatrix} A \\ B \\ C \end{bmatrix} = \begin{bmatrix} \sum_i^n f_{X_i}^2 & \sum_i^n f_{X_i} f_{Y_i} & \sum_i^n f_{X_i} f_{Z_i} \\ \sum_i^n f_{X_i} f_{Y_i} & \sum_i^n f_{Y_i}^2 & \sum_i^n f_{Y_i} f_{Z_i} \\ \sum_i^n f_{X_i} f_{Z_i} & \sum_i^n f_{Y_i} f_{Z_i} & \sum_i^n f_{Z_i}^2 \end{bmatrix}^{-1} \begin{bmatrix} \sum_i^n f_{X_i} \\ \sum_i^n f_{Y_i} \\ \sum_i^n f_{Z_i} \end{bmatrix};$$

where $f_X^b$, $f_Y^b$, $f_Z^b$ are output values of an accelerometer in the sensor; n is the total number of samples; i is the sampling point, i=1, 2, ..., n, n is a positive integer.

In the above method, the method for calculating the angle α between the plane where the apparatus locates and the horizontal plane is as below.

Assuming that the course angle of the apparatus during the first parking thereof is β, the angle α between the plane where the apparatus locates and the horizontal plane is calculated by the three-axis acceleration data at the time when the parking angle is β and the three-axis acceleration data at the time when the parking angle is (β+π), the formula for calculating α is as below:

$$\cos \alpha = \frac{\sqrt{(f_X(\beta)+f_X(\beta+\pi))^2 + (f_Y(\beta)+f_Y(\beta+\pi))^2 + (f_Z(\beta)+f_Z(\beta+\pi))^2}}{2g}.$$

In the above method, the step of carrying out the absolute alignment includes the following steps: building a Kalman filtering model for the absolute alignment, in which the Kalman filtering state vector: $\delta x^T = [(\delta p)^T \ (\delta v)^T \ (\delta \psi_{nb})^T \ (b_a^b)^T \ (b_g^b)^T]$; where δx is the error system vector; δp, δv, $\delta \psi_{nb}$ are position error, velocity error, and attitude angle error, respectively; $b_a^b$ and $b_g^b$ are acceleration zero-bias and gyroscope zero-bias, respectively; T indicates transposition; The Kalman filtering observation vector: $y=[p^T \ v^T]$; where p is GPS position information, v is GPS velocity information.

The updating equation of Kalman filtering system is as below:

$$\delta \dot{p} = \delta v^n$$

$$\delta \dot{v} = [(C_b^n f^b)^\wedge] \delta \psi_{nb}^n + C_b^n \delta f^b$$

$$\delta \dot{\psi}_{nb}^n \approx -C_b^n \delta \omega_{ib}^b;$$

where $\delta \dot{p}$, $\delta \dot{v}$, $\delta \dot{\psi}$ are the derivatives of δp, δv, $\delta \psi_{nb}$, respectively; $C_b^n$ is the rotation matrix from the coordinate system of apparatus to the coordinate system of navigation, $f^b$ and $\omega_{ib}^b$ are acceleration and angular velocity output by the sensor, respectively.

The initial attitude angle α calculated during the relative alignment is used as an initial value of $\delta \psi_{nb}$ in the Kalman filtering state vector, then the system vector is updated according to the updating equation of the Kalman filtering system and the Kalman filtering is carried out. After the Kalman filtering converges, the installation attitude angle error $\delta \psi_{nb}$ of the sensor is calculated.

In the above method, the apparatus is an agricultural apparatus, and the agricultural apparatus is a tractor.

The present invention uses a relative alignment and an absolute alignment. The relative alignment is used for aligning the coordinate system of MEMS-IMU sensor with the coordinate system of the tractor. The absolute alignment is used for aligning the coordinate system of the tractor with the coordinate system of navigation. A relative error attitude angle is calculated during the relative alignment. The relative error attitude angle is used as an initial value of attitude error in the state vector during the absolute alignment to speed up the convergence of the Kalman filtering. The process of absolute alignment can further improve the accuracy of alignment.

BRIEF DESCRIPTION OF THE DRAWINGS

With reference to the following drawings which illustrate the non-limiting embodiments in detail, the present invention and its features, shapes and advantages will become more apparent. Throughout the drawings, the same numerals refer to the same parts. The drawings are drawn without intending to the scale but aim to illustrate the principles of the present invention.

DETAILED DESCRIPTION OF THE INVENTION

In the following description, a number of specific details are set forth in order to provide a thorough understanding of the present invention. However, it is apparent to those skilled in the art that the present invention can be implemented without one or more details therein. In other examples, in order to avoid obscuring the present invention, the well-known features are not described.

In order to provide a thorough understanding of the present invention, the detailed steps and detailed structure are provided hereinafter, to explain the technical solution of the present invention. The preferred embodiments of the present invention are described in detail as below. However, the present invention may have other embodiments except for the detailed description.

Figure 1:
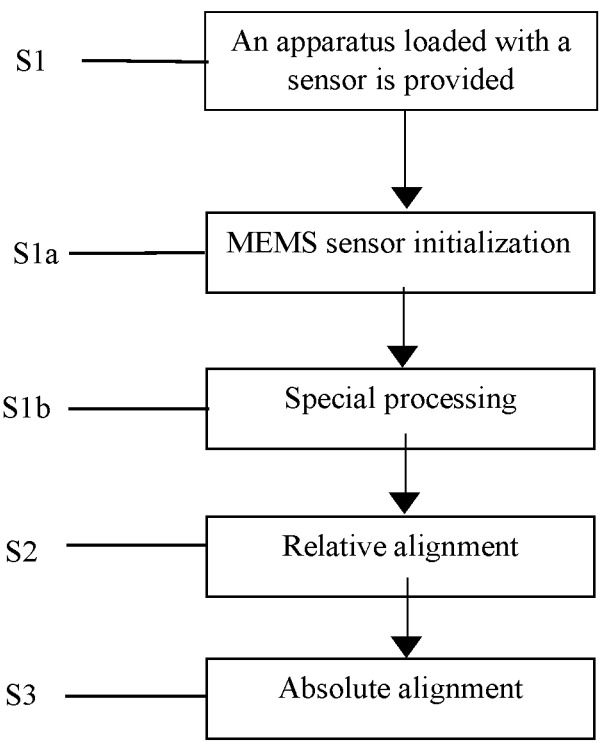
FIG. 1 is a schematic diagram of the method for initial alignment of the inertial navigation apparatus disclosed by the present invention.

The present invention provides a method for initial alignment of an inertial navigation apparatus. With reference to FIG. 1, the method essentially includes the following steps.

In Step S1, an apparatus loaded with a sensor is provided, and the sensor is preprocessed.

In an optional embodiment of the present invention, the step of preprocessing the sensor includes the following steps.

In Step S1a, the sensor is initialized;

In Step S1b, the filtering process, namely the special process shown in the drawings, is performed on the sensor to reduce an effect of vibration of the apparatus on the sensor.

In Step S2, a relative alignment process is carried out for calculating an installation error angle of the sensor.

Figure 2:
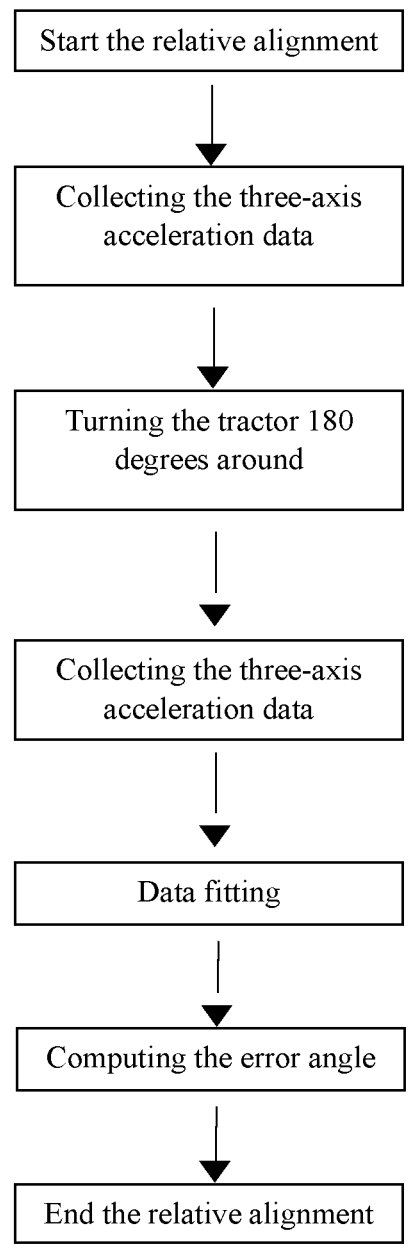
FIG. 2 is a flow chart of the relative alignment process of the present invention.

In an optional embodiment of the present invention, with reference to FIG. 2, the step of carrying out a relative alignment process includes the following steps. At the beginning, the apparatus is positioned to be stationary towards a direction, then the three-axis acceleration data is collected, then the apparatus is turned 180 degrees, then the three-axis acceleration data is collected, and then the installation error angle of the sensor is calculated to obtain the installation error angles of the sensor in different directions.

In the above method, the formula for calculating the installation error angles is:

$$A \cdot f_X^b + B \cdot f_Y^b + C \cdot f_Z^b = 1 \quad (1)$$

$$A = \frac{\sin \gamma \sin \varphi - \cos \gamma \sin \theta \cos \varphi}{g \cos \alpha}$$

$$B = \frac{\sin \gamma \cos \varphi + \cos \gamma \sin \theta \sin \varphi}{g \cos \alpha}$$

-continued $$C = \frac{\cos\gamma\cos\theta}{g\cos\alpha}$$

where A, B, C are model coefficients; $f_X^b$, $f_Y^b$, $f_Z^b$ are output values of an accelerometer in the sensor; $\gamma$, $\theta$, $\varphi$ are installation error angles of the sensor wherein $\gamma$ is a roll angle $\theta$ is a pitch angle and $\varphi$ is a yaw angle, g is the gravitational acceleration of the Earth, $\alpha$ is the angle between the plane where the apparatus locates and the horizontal plane.

A least square data fitting is conducted to obtain the formula for calculating the model coefficients A, B, C:

$$\begin{bmatrix} A \\ B \\ C \end{bmatrix} = \begin{bmatrix} \sum_i^n f_{X_i}^2 & \sum_i^n f_{X_i}f_{Y_i} & \sum_i^n f_{X_i}f_{Z_i} \\ \sum_i^n f_{X_i}f_{Y_i} & \sum_i^n f_{Y_i}^2 & \sum_i^n f_{Y_i}f_{Z_i} \\ \sum_i^n f_{X_i}f_{Z_i} & \sum_i^n f_{Y_i}f_{Z_i} & \sum_i^n f_{Z_i}^2 \end{bmatrix}^{-1} \begin{bmatrix} \sum_i^n f_{X_i} \\ \sum_i^n f_{Y_i} \\ \sum_i^n f_{Z_i} \end{bmatrix};$$

where $f_X^b$, $f_Y^b$, $f_Z^b$ are output values of an accelerometer in the sensor; n is the total number of samples; i is the sampling point, i=1, 2, ..., n, n is a positive integer. For example, n=8, 9, 10, 12 ....

The method for calculating the angle $\alpha$ between the plane where the apparatus locates and the horizontal plane is as below.

Assuming that the course angle of the apparatus during the first parking thereof is $\beta$, the angle $\alpha$ between the plane where the apparatus locates and the horizontal plane is calculated by the three-axis acceleration data at the time when the parking angle is $\beta$ and the three-axis acceleration data at the time when the parking angle is $(\beta+\pi)$, the formula for calculating $\alpha$ is as below:

$$\cos\alpha = \frac{\sqrt{(f_X(\beta)+f_X(\beta+\pi))^2+(f_Y(\beta)+f_Y(\beta+\pi))^2+(f_Z(\beta)+f_Z(\beta+\pi))^2}}{2g} \quad (3)$$

A, B, C, and $\alpha$ can be calculated by formula (2) and (3). Then A, B, C, and $\alpha$ are substituted into formula (1) to calculate the installation error angles $\gamma$, $\theta$, $\varphi$.

In Step S3, an absolute alignment process is carried out to calculate an installation attitude angle error of the sensor for further improving the accuracy of the error attitude angle calculated by the relative alignment.

Figure 3:
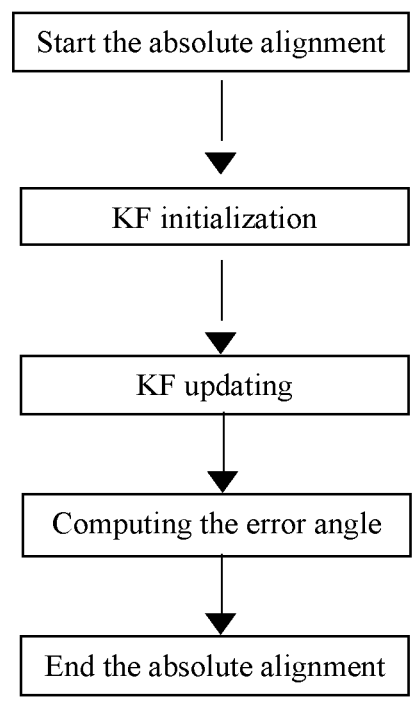
FIG. 3 is a flow chart of the absolute alignment process of the present invention.

In the present invention, with reference to FIG. 3, the step of carrying out the absolute alignment includes the following steps.

First, a Kalman filtering model is built for the absolute alignment.

The Kalman filtering State vector is obtained as $$\delta x^T = [(\delta p)^T (\delta v)^T (\delta \psi_{nb})^T (b_a^b)^T (b_g^b)^T]; \quad (4)$$

where $\delta x$ is the error system vector; $\delta p$, $\delta v$, $\delta\psi_{nb}$ are position error, velocity error, and an installation attitude angle error, respectively; $b_a^b$ and $b_g^b$ are acceleration zero-bias and gyroscope zero-bias, respectively; T indicates transposition.

After that, the Kalman filtering observation vector is obtained as $$y = [p^T v^T]; \quad (5)$$

where, p is GPS position information, and v is GPS velocity information.

Next, the updating equation of the Kalman filtering system is built as below:

$$\delta\dot{p} = \delta v^n$$

$$\delta\dot{v} = [(C_b^n f^b)^\times]\delta\psi_{nb}^n + C_b^n \delta f^b$$

$$\delta\dot{\psi}_{nb}^n \approx -C_b^n \delta\omega_{ib}^b \quad (6)$$

where $\delta\dot{p}$, $\delta\dot{v}$, $\delta\dot{\psi}$ are the derivatives of $\delta p$, $\delta v$, $\delta\psi_{nb}$, respectively; $C_b^n$ is the rotation matrix from the coordinate system of the apparatus to the coordinate system of navigation, and $f^b$ and $\psi_{ib}^b$ are acceleration and angular velocity output by the sensor, respectively.

The initial attitude angle $\alpha$ calculated by the formula (3) of the relative alignment is used as an initial value of $\delta\psi_{nb}$ in the Kalman filtering state vector (or entitled as Kalman state vector), then the Kalman filtering system vector is updated according to the formula (6) and the Kalman filtering is carried out.

After the Kalman filtering converges, the calculated and output attitude angle is a relatively correct installation attitude angle error $\delta\psi_{nb}$ of the sensor (i.e. the alignment angle). The accuracy of error attitude angle calculated by the relative alignment can be further improved by the installation attitude angle error $\delta\psi_{nb}$.

In an optional embodiment of the present invention, the apparatus is an agricultural apparatus. For example, the agricultural apparatus is an agricultural tractor.

The implementation of the low-cost inertial navigation apparatus for the agricultural apparatus (i.e. the three-axis accelerometer and the three-axis gyroscope) in the present invention includes two aspects, i.e., the relative alignment and the absolute alignment. The relative alignment is used for aligning the coordinate system of MEMS-IMU sensor with the coordinate system of the tractor. The absolute alignment is used for aligning the coordinate system of the tractor with the coordinate system of navigation. A relative error attitude angle is calculated during the relative alignment. The relative error attitude angle is used as an initial value of the attitude error in the state vector during the absolute alignment to increase the converging speed of the Kalman filtering. The process of absolute alignment can further improve the accuracy of alignment.

Since the present invention adopts the above technical solution, it has the following advantages.

(1) The method for initial alignment of an inertial navigation in the present invention can eliminate the requirement of the high-precision gyroscope in the traditional alignment method.

(2) The alignment can be achieved without any other peripheral equipment in the present invention and the present invention has a higher precision of alignment.

(3) The method for initial alignment and inertial navigation in the present invention can increase the converging speed of the Kalman filtering and can greatly reduce the attitude angle error, the velocity error, and the position error accumulated over time.

The preferred embodiments of the invention are described above. It should be understood that the present invention is not limited to the specific embodiments described above. The apparatus and structures not being described in detail should be understood and implemented in a conventional manner as in the art. Any person skilled in the art can use the method and technical content disclosed above to make a number of variations and modifications or equivalent embodiments varied by equivalent modifications according to the technical solution of the present invention without departing from the scope of the technical solution of the present invention. This does not affect the substantive content of the present invention. Thus, any simple modification, equivalent variations and modifications applied to the technical substantive content of the present invention without departing from the technical solution of the present invention still fall within the scope of protection of the present invention.

What is claimed is:

1. A method for determining an initial alignment of an inertial navigation apparatus including a MEMS-IMU sensor and a processor, wherein the method comprises the following steps:
   determining, by the processor, a relative alignment to calculate an installation error angle of the sensor, wherein the relative alignment is used for aligning a coordinate system of the sensor with a coordinate system of a tractor;
   determining, by the processor, an absolute alignment to calculate an installation attitude angle error of the sensor to increase an accuracy of an error attitude angle calculated during the relative alignment, wherein the absolute alignment is used for aligning the coordinate system of the tractor with a geographic coordinate system of the navigation apparatus and the error attitude angle calculated during the relative alignment is used based on an initial value of an attitude error in a state vector during the absolute alignment;
wherein the step of carrying out the relative alignment comprises the following steps:
   positioning, by the processor, the inertial navigation apparatus to be stationary towards a direction and collecting, by the processor, three-axis acceleration data,
   rotating, by the processor, the inertial navigation apparatus by 180 degrees and further collecting, by the processor, three-axis acceleration data, and
   calculating, by the processor, the installation error angle of the sensor to obtain the installation error angle of the sensor in different directions.

2. The method of claim 1, wherein the step of calculating the installation error angle includes a formula as:

$$A \cdot f_X^b + B \cdot f_Y^b + C \cdot f_Z^b = 1$$

$$A = \frac{\sin\gamma \sin\varphi - \cos\gamma \sin\theta \cos\varphi}{g \cos\alpha}$$

$$B = \frac{\sin\gamma \cos\varphi + \cos\gamma \sin\theta \sin\varphi}{g \cos\alpha}$$

$$C = \frac{\cos\gamma \cos\theta}{g \cos\alpha},$$

where A, B, C are model coefficients; $f_X^b$, $f_Y^b$, $f_Z^b$ are output values of an accelerometer in the sensor; $\gamma$, $\theta$, $\varphi$ are the installation error angles of the sensor wherein $\gamma$ is a roll angle, $\theta$ is a pitch angle and $\varphi$ is a yaw angle, g is a gravitational acceleration of the Earth, $\alpha$ is an angle between a plane where the apparatus is located and a horizontal plane.

3. The method of claim 2, in the step of calculating the model coefficients A, B, C using a formula includes a least square data fitting as:

$$\begin{bmatrix} A \\ B \\ C \end{bmatrix} = \begin{bmatrix} \sum_i^n f_{X_i}^2 & \sum_i^n f_{X_i} f_{Y_i} & \sum_i^n f_{X_i} f_{Z_i} \\ \sum_i^n f_{X_i} f_{Y_i} & \sum_i^n f_{Y_i}^2 & \sum_i^n f_{Y_i} f_{Z_i} \\ \sum_i^n f_{X_i} f_{Z_i} & \sum_i^n f_{Y_i} f_{Z_i} & \sum_i^n f_{Z_i}^2 \end{bmatrix}^{-1} \begin{bmatrix} \sum_i^n f_{X_i} \\ \sum_i^n f_{Y_i} \\ \sum_i^n f_{Z_i} \end{bmatrix}$$

where $f_X^b$, $f_Y^b$, $f_Z^b$ are output values of the accelerometer in the sensor; n is a total number of samples; i is a sampling point, i=1, 2, . . . , n, n is positive integer.

4. The method of claim 2, wherein:
calculating the horizontal plane comprises the following steps:
   identifying, by the processor, a course angle of the inertial navigation apparatus during a first parking thereof as $\beta$,
   locating, the angle $\alpha$ between the plane where the inertial navigation apparatus is located, and
   calculating, by the processor, the horizontal plane based on the three-axis acceleration data at the time when the parking angle is $\beta$ and the three-axis acceleration data at the time when the parking angle is $(\beta+\pi)$, a formula for calculating $\alpha$ as:

$$\cos\alpha = \frac{\sqrt{(f_X(\beta)+f_X(\beta+\pi))^2 + (f_Y(\beta)+f_Y(\beta+\pi))^2 + (f_Z(\beta)+f_Z(\beta+\pi))^2}}{2g}.$$

5. The method of claim 4, wherein the step of carrying out the absolute alignment comprises the following steps:
   developing, by the processor, a Kalman filtering model for the absolute alignment, wherein
   a Kalman filtering state vector: $\delta x^T = [(\delta p)^T \ (\delta v)^T \ (\delta\psi_{nb})^T \ (b_a^b)^T \ (b_g^b)^T]$; where $\delta x$ is an error system vector; $\delta p$, $\delta v$, $\delta\psi_{nb}$ are a position error, a velocity error, and an installation attitude angle error, respectively; $b_a^b$ and $b_g^b$ are an acceleration zero-bias and a gyroscope zero-bias, respectively; T indicates a transposition;
   a Kalman filtering observation vector: $y=[p^T \ v^T]$; where p is GPS position information, v is GPS velocity information from GPS;
   an updating equation of the Kalman filtering system is as below:

$$\delta\dot{p} = \delta v^n$$

$$\delta\dot{v} = [(C_b^n f^b)]^{\delta\psi_{nb}^n} + C_b^n \delta f^b$$

$$\delta\dot{\psi}_{nb}^n \approx -C_b^n \delta\omega_{ib}^b$$

where $\delta\dot{p}$, $\delta\dot{v}$, $\delta\dot{\psi}$ are derivatives of $\delta p$, $\delta v$, $\delta\psi_{nb}$, respectively; $C_b^n$ is a rotation matrix from a coordinate system of the apparatus to a coordinate system of the navigation, $f^b$ and $\omega_{ib}^b$ are acceleration and an angular velocity output by the sensor, respectively;
   an initial attitude angle $\alpha$ calculated by the relative alignment is used as an initial value of $\delta\psi_{nb}$ in the Kalman filtering state vector, then the system vector is updated according to the updating equation of the Kalman filtering system and the Kalman filtering is carried out; after the Kalman filtering converges, an installation attitude angle error $\delta\psi_{nb}$ of the sensor is calculated.

6. The method of claim 1, wherein the apparatus is an agricultural apparatus, and the agricultural apparatus is the tractor.

\* \* \* \* \*